July 1, 1924.
R. J. GRIESEDIECK
1,499,820
HOOD ATTACHMENT FOR AUTOMOBILES
Filed Nov. 21, 1919
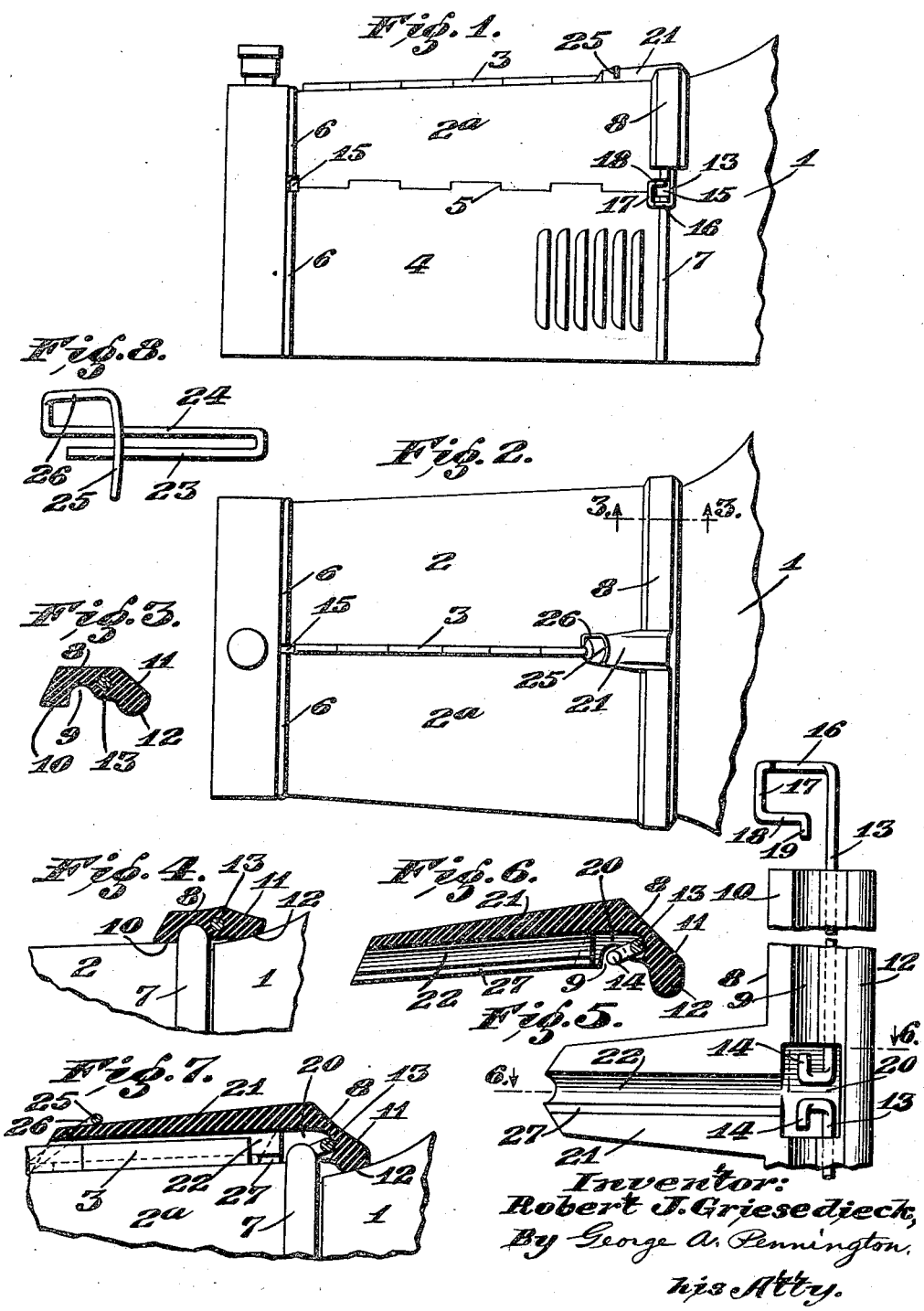
Inventor:
Robert J. Griesedieck,
By George A. Pennington,
his Atty.

Patented July 1, 1924.

1,499,820

UNITED STATES PATENT OFFICE.

ROBERT J. GRIESEDIECK, OF ST. LOUIS, MISSOURI.

HOOD ATTACHMENT FOR AUTOMOBILES.

Application filed November 21, 1919. Serial No. 339,635.

*To all whom it may concern:*

Be it known that I, ROBERT J. GRIESE-DIECK, a citizen of the United States, residing in the city of St. Louis and State of Missouri, have invented a new and useful Improvement in Hood Attachments for Automobiles, of which the following is a specification.

This invention relates to hood attachments for automobiles and has for its object to weather-proof the joint between the hood and cowl and also the hinge joints of the hood in the same region, where water, due to rain or other causes, is liable to enter and short-circuit or interfere with the operation of electrical controlling and operating devices of the automobile.

In certain automobile structures, electrical coils and devices are usually carried on the dash or foot board which is located at the juncture of the cowl and hood. Water entering the joint at the upper portion of the hood and cowl comes in contact with these devices and interferes with, and in some cases, entirely prevents, the operation of them. The present invention is designed to avoid this, and it consists in a novel construction of a flexible and resilient strip which may be readily attached to the hood so as to bear thereon throughout its length and has an overhanging edge portion to bear on the adjacent face of the cowl. In the preferable structure the device is also attached to the hinged hood sections so as to be movable therewith in opening and closing the hood and so as not to mar the finish of the cowl.

In the accompanying drawing illustrating a practical adaptation of the invention,—

Figure 1 is a side elevation of the hood and forward portion of the cowl of an automobile and showing the weather-strip in place;

Figure 2 is a top plan view;

Figure 3 is a cross section of the strip on or about the line 3—3 of Figure 2, but in normal detached condition;

Figure 4 is a fragmentary view of the hood and cowl showing the cross sectional shape of the strip when applied;

Figure 5 is a fragmentary, inner face view of the middle and one end portion of the strip detached;

Figure 6 is a section on or about the line 6—6 of Figure 5;

Figure 7 is a fragmentary view of the hood and cowl and a section of the middle portion of the strip as applied; and Figure 8 is a detail view of a retaining clip for the middle, lateral extension of the strip.

Referring now to the drawing, the numeral 1 designates the cowl of an automobile, the forward portion of which underlies the rear portion of the hood which covers the engine and forward works of the machine. The illustration in the drawing represents more particularly the hood and cowl of a Ford car. The hood comprises two upper sections 2 and 2$^a$, hinged, as at 3, and lower side sections 4 which are hinged to the upper sections, as at 5. The front and rear marginal portions of the hood sections are formed with hollow ribs or beads 6 and 7, respectively.

A weather-strip 8, preferably of rubber or some suitable flexible and resilient material which is waterproof, is attached about the marginal portions of the two upper sections of the hood. This strip, as shown, is grooved longitudinally on its under side, as at 9, to fit over the bead 7 and permit the edge portion 10 to come in contact with the surface of the hood adjacent thereto, while the opposite edge portion 11, which overhangs from the hood, is formed with a rib 12 which normally extends to a plane beyond that of the under part of the edge portion 10 so as to come under compression in contact with the adjacent face portion of the cowl.

As the cowl of some cars, particularly the late models of the Ford, is depressed somewhat about the middle of the upper part thereof where the hood overlaps, the rib 12 is therefore made higher at the middle of the strip than at the ends thereof, the comparison being shown in Figures 3 and 6. In practice the portion of the rib which is highest will extend considerably on each side of the middle of the strip and then taper towards the ends.

To hold the strip in place it is preferable to imbed a wire 13 therein and have the ends of the wire arranged to engage the respective hood sections 2 and 2$^a$. As shown, the wire is in two sections. The inner end portions of the two sections of the wire are rebent to afford hooks 14 to fit in the ends of the bead 7 at the meeting edges of the upper hood sections 2 and 2ª, the spaces 15 which are usually present at the front and rear ends of the hood, as shown, facilitating this attachment.

The outer end portions of the wire sections are preferably formed as shown in Figures 1 and 5. That is, the wire is first turned substantially at a right angle, as at 16 and arched slightly to accommodate the bead 7, thence carried back parallel with the main body portion, as at 17, and then turned inward, as at 18, to provide a spring tongue, at the end of which is a hook 19 to enter the bead at the hinge joint 5. In this way, the hooks 14 may be first inserted in the meeting end portions of the bead 7 at the top of the hood, and after the strip is placed along the marginal portions of the hood sections 2 and 2ª, with the bead in the groove 9 of the strip, the hooks 19 are sprung into the opposite ends of the bead.

Preferably, the wire, while being resilient, is sufficiently stiff to be shaped so as to conform to and retain the contour of the hood, so that, when the hood sections are swung up on the hinge joint 3, the strip will remain securely in place. To facilitate the application of the hooks 14 to the bead, the strip is recessed, as at 20, in the region of the hooks. This also reduces the thickness of the strip and enables it to bend more readily in the region of the hinge joint 3 of the hood sections as the latter are raised.

At the middle of the strip a lateral extension 21 is provided to lap over the hinge joint 3. This extension is grooved, as at 22, to accommodate the raised bead through which the pintle of the hinge extends. This extension may extend only a short distance, as shown, or, obviously, it may be extended the full length of the hood if desired; but, for practical purposes, it has been found necessary to extend it just far enough to prevent water from coming in contact with the appliances which are mounted on or in close proximity to the dash or foot board or in the immediate vicinity of the juncture of the hood and cowl.

In some cases a device may be used to hold the extension 21 down upon the hood. For this purpose, a clip, as shown in Figure 8, may be employed. One leg, 23, of this clip may be inserted in the bead of the hinge joint 3, alongside of the pintle, or under the hood section, with the parallel leg, 24, lying on top of the hood close to the bead of the hinge joint. The nose of the extension 21 is inserted under the transverse, arched portion 25 of the clip formed at the end of an upwardly inclined, rebent portion 26 of the leg 24; and to accommodate the leg 24, the extension 21 of the strip is provided with a supplemental groove 27.

The structure shown in the drawing is only one embodiment of the invention, and, obviously, the invention is not to be limited to such, as considerable modification is contemplated within the scope and spirit thereof as defined by the appended claims.

What is claimed is:

1. A weather-strip having provision at its ends for attachment to the hood of an automobile, said strip having a marginal rib engageable throughout its length in sealing contact with the hood, said strip overhanging the margin of the hood and having a bead at the margin of its overhanging portion engageable throughout its length in sealing contact with the cowl of the automobile.

2. A weather-strip comprising resilient material, having provision at its ends for attachment to the hood of an automobile, the under side of the strip being grooved longitudinally and one marginal portion being engageable throughout with the hood, the opposite marginal portion of the strip overhanging the margin of the hood and extending to a plane beyond that of the first mentioned marginal portion which engages the hood and having a rib on its under side to engage the cowl.

3. A detachable weather-strip for direct attachment to the hood and having marginal, longitudinally extending portions on its under side to respectively engage the marginal portion of the hood and the adjacent face of the cowl of an automobile with sealing effect throughout, and a longitudinal tension and supporting element extending medially of said strip and having its end portions engageable with the hood.

4. A detachable weather-strip of flexible and resilient, waterproof material overlapping the marginal portion of the hood and the adjacent face of the cowl of an automobile, and a longitudinally extending tension and supporting element comprising a wire imbedded in said strip, said element being conformable to the contour of the hood and having its end portions engageable with the hood, whereby said strip is movable with the hood sections in opening and closing and the marginal portions of the strip are held in contact with the hood and cowl and under compression in the closed condition of the hood.

5. A weather-strip for the purpose described, the same comprising resilient material, the under side of the strip being grooved longitudinally and one marginal portion being engageable throughout with the hood and the opposite marginal portion having a rib on its under side extending normally to a plane beyond that of the first mentioned marginal portion whereby to engage the face of the cowl under compression, and a longitudinal supporting element extending through said strip adjacent to the groove therein and having provision for detachable engagement with the hood.

6. A weather-strip detachably engaged with the hood of an automobile and overlapping the joint between said hood and the cowl of the automobile and having an integral transverse extension overlapping the longitudinal hinge joint of the hood, means for detachably securing said strip on said hood, and means for detachably securing said lateral extension of the strip in engagement with said hood.

ROBT. J. GRIESEDIECK.